(12) United States Patent
Kavanaugh

(10) Patent No.: US 8,196,338 B2
(45) Date of Patent: *Jun. 12, 2012

(54) FISHING LINE STOP HAVING A CHANNEL OFFSET

(76) Inventor: Patrick J. Kavanaugh, Eau Claire, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/876,386

(22) Filed: Sep. 7, 2010

(65) Prior Publication Data

US 2011/0056116 A1  Mar. 10, 2011

Related U.S. Application Data

(63) Continuation of application No. 11/803,258, filed on May 14, 2007, now Pat. No. 7,805,881.

(51) Int. Cl.
*A01K 95/00* (2006.01)
*A01K 91/06* (2006.01)
*A44C 25/00* (2006.01)

(52) U.S. Cl. .............. 43/44.91; 43/44.87; 43/44.89; 43/44.9; 43/44.92; 24/130; 24/460; 63/38

(58) Field of Classification Search ............ 43/44.89, 43/44.9, 44.91, 44.92, 44.95, 44.87, 43.1, 43/57.1, 25.2; 24/460, 462, 30.5 R, 30.5 P, 24/30.5 S; 220/837, 839, 833–836, 780, 220/810, 816; 63/38

See application file for complete search history.

(56) References Cited

U.S. PATENT DOCUMENTS

| 419,574 | A | * | 1/1890 | Vasseur | 43/44.92 |
| 676,724 | A | * | 6/1901 | McCargar et al. | 43/44.95 |
| 822,694 | A | * | 6/1906 | Shepherd | 43/44.89 |
| 1,098,018 | A | * | 5/1914 | Cook | 43/44.91 |
| 1,176,631 | A | * | 3/1916 | Wells | 43/44.91 |
| 1,240,043 | A | * | 9/1917 | Gregory et al. | 43/44.9 |
| 2,077,184 | A | * | 4/1937 | Rader et al. | 43/44.87 |
| 2,351,558 | A | * | 6/1944 | Sykora | 43/44.87 |
| 2,395,892 | A | * | 3/1946 | Lontz | 43/44.91 |
| 2,406,252 | A | * | 8/1946 | Potter | 43/44.9 |

(Continued)

FOREIGN PATENT DOCUMENTS

EP   105674 A2 *  4/1984

(Continued)

OTHER PUBLICATIONS

Official Action dated Apr. 2, 2009, for Related U.S. Appl. No. 11/803,258, filed May 14, 2007. Restriction Requirement dated Oct. 6, 2009, for Related U.S. Appl. No. 11/803,258, filed May 14, 2007.
Official Action dated Jan. 22, 2010, for Related U.S. Appl. No. 11/803,258, filed May 14, 2007.
Notice of Allowance dated Jun. 7, 2010, for Related U.S. Appl. No. 11/803,258, filed May 14, 2007.

*Primary Examiner* — Darren W Ark
(74) *Attorney, Agent, or Firm* — Westman, Champlin & Kelly, P.A.

(57) ABSTRACT

Fishing line stops are disclosed. Fishing line stops illustratively include a lid and a main body. The lid has inner and outer walls. The lid outer wall forms a portion of an outer surface of the fishing line stop. The lid inner wall has first and second surfaces. The lid inner wall first and second surfaces are separated from each other by a lid offset that runs perpendicular to a central longitudinal axis. The main body has inner and outer walls. The main body inner wall forms another portion of the outer surface of the fishing line stop. The main body inner wall has first and second surfaces. The main body inner wall first and second surfaces are separated from each other by a main body offset that runs perpendicular to the central longitudinal axis.

13 Claims, 11 Drawing Sheets

U.S. PATENT DOCUMENTS

| | | | | |
|---|---|---|---|---|
| 2,428,497 | A * | 10/1947 | Meek | 43/44.89 |
| 2,481,346 | A * | 9/1949 | Rigby | 43/44.87 |
| 2,741,067 | A | 4/1956 | Cox | |
| 2,754,616 | A * | 7/1956 | Law | 43/44.91 |
| 2,791,060 | A * | 5/1957 | Kender | 43/44.9 |
| 2,904,924 | A * | 9/1959 | Tashiro | 43/44.89 |
| 2,983,068 | A * | 5/1961 | Grayson | 43/44.89 |
| 3,019,545 | A * | 2/1962 | Long | 43/44.89 |
| 3,019,546 | A * | 2/1962 | Hansen | 43/44.91 |
| 3,104,487 | A * | 9/1963 | Havel | 43/44.9 |
| 3,107,451 | A * | 10/1963 | Sitzler et al. | 43/44.92 |
| 3,173,222 | A * | 3/1965 | Hansen | 43/44.91 |
| 3,197,914 | A * | 8/1965 | Beverly | 43/44.91 |
| 3,241,262 | A * | 3/1966 | Beverly | 43/44.91 |
| 3,280,870 | A * | 10/1966 | Bundy | 206/526 |
| 3,293,792 | A * | 12/1966 | Bittaker, Jr. | 43/44.89 |
| 3,395,788 | A * | 8/1968 | Gill | 43/54.1 |
| 3,533,184 | A | 10/1970 | Kerr | |
| 3,571,861 | A * | 3/1971 | Olson | 24/30.5 R |
| 3,638,347 | A * | 2/1972 | Kochevar | 43/44.89 |
| 4,006,764 | A * | 2/1977 | Yamamoto et al. | 206/320 |
| 4,015,361 | A * | 4/1977 | O'Reilly et al. | 43/25.2 |
| 4,145,833 | A * | 3/1979 | Ratte | 43/44.91 |
| 4,194,655 | A * | 3/1980 | Tillotson | 224/191 |
| 4,200,190 | A | 4/1980 | Tyson | |
| 4,305,534 | A | 12/1981 | Sarig | |
| 4,426,804 | A * | 1/1984 | Hutson | 43/44.91 |
| 4,459,775 | A * | 7/1984 | Ratte | 43/44.89 |
| 4,478,381 | A | 10/1984 | Pittion et al. | |
| 4,534,089 | A * | 8/1985 | Swan | 24/30.5 P |
| 4,563,831 | A * | 1/1986 | Gibney | 43/44.91 |
| 4,662,038 | A * | 5/1987 | Walker | 24/462 |
| 4,780,981 | A * | 11/1988 | Hayward et al. | 43/44.91 |
| 4,796,300 | A * | 1/1989 | Branson | 24/462 |
| 4,864,767 | A * | 9/1989 | Drosdak | 43/44.89 |
| 4,893,433 | A * | 1/1990 | Scheffler et al. | 43/44.92 |
| 4,942,271 | A * | 7/1990 | Corsi et al. | 220/835 |
| 4,949,645 | A * | 8/1990 | Hayward et al. | 43/44.89 |
| 4,964,236 | A * | 10/1990 | Adams | 43/44.92 |
| 5,203,107 | A | 4/1993 | O'Brien et al. | |
| 5,241,776 | A * | 9/1993 | Adams | 43/44.92 |
| 5,369,847 | A * | 12/1994 | Naya et al. | 24/30.5 R |
| 5,377,443 | A * | 1/1995 | Giray et al. | 43/44.9 |
| 5,417,008 | A * | 5/1995 | Smith | 43/44.95 |
| 5,444,937 | A * | 8/1995 | Borner | 43/44.91 |
| 5,457,909 | A * | 10/1995 | Graves | 43/44.91 |
| 5,575,104 | A * | 11/1996 | Wilding | 43/25.2 |
| D385,061 | S * | 10/1997 | Malik | D28/42 |
| 5,713,152 | A * | 2/1998 | Domack | 43/44.95 |
| 5,794,315 | A * | 8/1998 | Crabtree et al. | 24/30.5 R |
| 5,899,334 | A * | 5/1999 | Domerchie et al. | 206/470 |
| 6,061,941 | A * | 5/2000 | Verret | 40/603 |
| 6,125,574 | A | 10/2000 | Ganaja et al. | |
| 6,301,825 | B1* | 10/2001 | Doreian | 43/57.1 |
| 6,508,098 | B2* | 1/2003 | Ratte | 43/44.89 |
| 6,513,278 | B1 | 2/2003 | Jorgensen | |
| 6,550,179 | B1* | 4/2003 | Seay | 43/44.91 |
| 6,602,101 | B2* | 8/2003 | deDoes | 441/1 |
| 6,606,814 | B1* | 8/2003 | Weaver | 43/25.2 |
| 6,637,080 | B2* | 10/2003 | Verret | 24/460 |
| 6,857,219 | B2* | 2/2005 | Jang | 43/25.2 |
| 6,931,786 | B1* | 8/2005 | Bennett | 43/44.89 |
| 6,996,879 | B1* | 2/2006 | Savicki | 24/30.5 R |
| 6,996,931 | B1* | 2/2006 | Ratte | 43/44.91 |
| 7,007,507 | B2* | 3/2006 | Enevoldsen | 63/3.1 |
| 7,069,687 | B2* | 7/2006 | Jang | 43/57.1 |
| 7,080,477 | B2* | 7/2006 | Shannon | 43/57.1 |
| 7,162,830 | B2* | 1/2007 | Sims | 43/44.9 |
| 7,204,388 | B2* | 4/2007 | Galland et al. | 220/839 |
| 7,481,020 | B1* | 1/2009 | Ruzicka | 43/44.91 |
| 7,490,433 | B2* | 2/2009 | Schoenike | 43/44.91 |
| 7,565,763 | B1* | 7/2009 | Ruzicka | 43/44.91 |
| 7,614,179 | B2* | 11/2009 | Kavanaugh | 43/44.91 |
| 7,665,192 | B2* | 2/2010 | Blythe et al. | 24/30.5 R |
| 7,805,881 | B2* | 10/2010 | Kavanaugh | 43/44.91 |
| 2002/0178646 | A1* | 12/2002 | Ratte | 43/44.9 |
| 2003/0135959 | A1* | 7/2003 | Wales | 24/30.5 R |
| 2004/0045134 | A1* | 3/2004 | Savicki | 24/30.5 R |
| 2004/0250462 | A1* | 12/2004 | Trebil | 43/25.2 |
| 2005/0011109 | A1* | 1/2005 | Valentyne | 43/89 |
| 2005/0091909 | A1* | 5/2005 | Hanes | 43/44.87 |
| 2005/0160657 | A1* | 7/2005 | Dodge | 43/25.2 |
| 2005/0178042 | A1* | 8/2005 | Dodge | 43/25.2 |
| 2005/0279011 | A1 | 12/2005 | Schoenike | |
| 2006/0162233 | A1* | 7/2006 | Hueso Pajares | 43/44.91 |
| 2007/0089354 | A1* | 4/2007 | Franolic | 43/44.91 |
| 2007/0095848 | A1* | 5/2007 | Galland et al. | 220/839 |
| 2007/0157505 | A1* | 7/2007 | Dodge | 43/25.2 |
| 2008/0034640 | A1* | 2/2008 | Naerheim et al. | 43/44.92 |
| 2008/0256760 | A1* | 10/2008 | Kavanaugh | 43/44.91 |
| 2008/0283539 | A1* | 11/2008 | Salice | 220/839 |
| 2008/0295386 | A1* | 12/2008 | Hudson | 43/44.91 |
| 2009/0013585 | A1* | 1/2009 | Acworth et al. | 43/44.91 |
| 2011/0225872 | A1* | 9/2011 | Farley et al. | 43/44.91 |

FOREIGN PATENT DOCUMENTS

| | | |
|---|---|---|
| EP | 190932 | 8/1986 |
| EP | 190932 A1 * | 8/1986 |
| EP | 1358796 A1 | 5/2003 |
| EP | 1358796 A1 * | 11/2003 |
| FR | 2613906 | 4/1987 |
| FR | 2613906 A1 * | 10/1988 |
| FR | 2708175 | 6/1993 |
| FR | 2708175 A1 * | 2/1995 |
| GB | 2139861 A | 5/1983 |
| GB | 2139861 A * | 11/1984 |
| GB | 2157932 A * | 11/1985 |
| GB | 2170682 A * | 8/1986 |
| GB | 2173982 | 10/1986 |
| GB | 2173982 A * | 10/1986 |
| GB | 2191373 | 12/1987 |
| GB | 2191373 A * | 12/1987 |
| GB | 2196221 | 4/1988 |
| GB | 2196221 A * | 4/1988 |
| GB | 2203621 | 10/1988 |
| GB | 2203621 A * | 10/1988 |
| GB | 2330755 | 5/1999 |
| GB | 2330755 A * | 5/1999 |
| JP | 07308144 | 11/1995 |
| JP | 07308144 A * | 11/1995 |
| JP | 08228652 | 9/1996 |
| JP | 08228652 A * | 9/1996 |
| JP | 08266201 | 10/1996 |
| JP | 08266201 A * | 10/1996 |
| JP | 09299002 | 11/1997 |
| JP | 09299002 A * | 11/1997 |
| JP | 10094354 | 4/1998 |
| JP | 10094354 A * | 4/1998 |
| JP | 10210907 | 8/1998 |
| JP | 10210907 A * | 8/1998 |
| JP | 11089493 | 4/1999 |
| JP | 11089493 A * | 4/1999 |
| JP | 11289940 | 10/1999 |
| JP | 11289940 A * | 10/1999 |
| JP | 2000069892 | 3/2000 |
| JP | 2000069892 A * | 3/2000 |
| JP | 2001086910 | 4/2001 |
| JP | 2001086910 A * | 4/2001 |
| JP | 2001120136 | 5/2001 |
| JP | 2001120136 A * | 5/2001 |
| JP | 200169102 | 10/2001 |
| JP | 2001269101 | 10/2001 |
| JP | 2001269101 A * | 10/2001 |
| JP | 2001269102 A * | 10/2001 |
| JP | 2001275536 | 10/2001 |
| JP | 2001275536 A * | 10/2001 |
| JP | 2001275537 | 10/2001 |
| JP | 2001275537 A * | 10/2001 |
| JP | 2002034410 | 2/2002 |
| JP | 2002034410 A * | 2/2002 |
| JP | 2002065133 | 3/2002 |
| JP | 2002065133 A * | 3/2002 |
| JP | 2002084948 | 3/2002 |
| JP | 2002084948 A * | 3/2002 |

| | | | | | | |
|---|---|---|---|---|---|---|
| JP | 2002335838 | | 11/2002 | JP | 2003299428 A * | 10/2003 |
| JP | 2002335838 A * | 11/2002 | | JP | 2005229940 A * | 9/2005 |
| JP | 2003189774 | | 7/2003 | JP | 2007082494 A * | 4/2007 |
| JP | 2003189774 A * | 7/2003 | | | |
| JP | 2003299428 | | 10/2003 | * cited by examiner | | icon
FISHING LINE STOP HAVING A CHANNEL OFFSET

REFERENCE TO RELATED CASE

The present application is a continuation of and claims the priority of application Ser. No. 11/803,258 filed on May 14, 2007, the content of which is hereby incorporated by reference in its entirety.

BACKGROUND

A bead typically has a spherical shape with a hole extending through a central axis of the bead. The end of a string may be pushed or threaded through the hole in the bead so that the bead is affixed to the string but can slip along the string. A bead of this design is put on a string by pushing the string through the hole in the bead. In order to be able to affix the bead on the string, the end of the string must be free of knots or restrictions and cannot be tied to some other device. In other words, if knots or obstructions are on the string that portion or end of the string will not be able to be pushed through the hole in the bead. The user may have no alternative but to cut the string so that the string can go into the hole in the bead. The typical bead also typically has a hole in the bead larger than the diameter of the string so the string is more easily pushed through the hole.

Over the years, various devices have been constructed for attachment to a string through a fixed hole in the device. In many situations a user may wish to rig a string with one or more objects attached to the ends of the string. While using the rigged string the user may also wish to attach an additional object to the string without removing the objects already affixed on either end of the string.

For example, a user may wish to add a bead to a string of beads without removing any of the beads that are already threaded on the string. The bead to be added may, for example, be of a different color so as to compliment the beads presently on the string. Preferably, the additional bead should be added to the string without removing any of the beads presently on the string. To add a bead to the middle of a string of beads would require half the beads to be removed, the new bead could be added and all the beads that were removed would have to be strung back on the string of beads again.

Devices have been described in an attempt to allow for quick attachment to a string. For example, U.S. Pat. No. 6,931,786 describes a fisherman sinker-bobber; U.S. Pat. No. 5,203,107 describes a fishing line limit assembly; and U.S. Pat. No. 5,377,443 describes glass fishing weights. Although these devices may be attached to a string or line without threading through a hole, the disadvantages of these devices and the advantages of the present invention should become apparent to those skilled in the art from a review of the description of the invention

SUMMARY

Embodiments of the present disclosure include fishing line stops. Fishing line stops illustratively include a lid and a main body. The lid has inner and outer walls. The lid outer wall forms a portion of an outer surface of the fishing line stop. The lid inner wall has first and second surfaces. The lid inner wall first and second surfaces are separated from each other by a lid offset that runs perpendicular to a central longitudinal axis. The main body has inner and outer walls. The main body inner wall forms another portion of the outer surface of the fishing line stop. The main body inner wall has first and second surfaces. The main body inner wall first and second surfaces are separated from each other by a main body offset that runs perpendicular to the central longitudinal axis.

DETAILED DESCRIPTION

Figure 1:
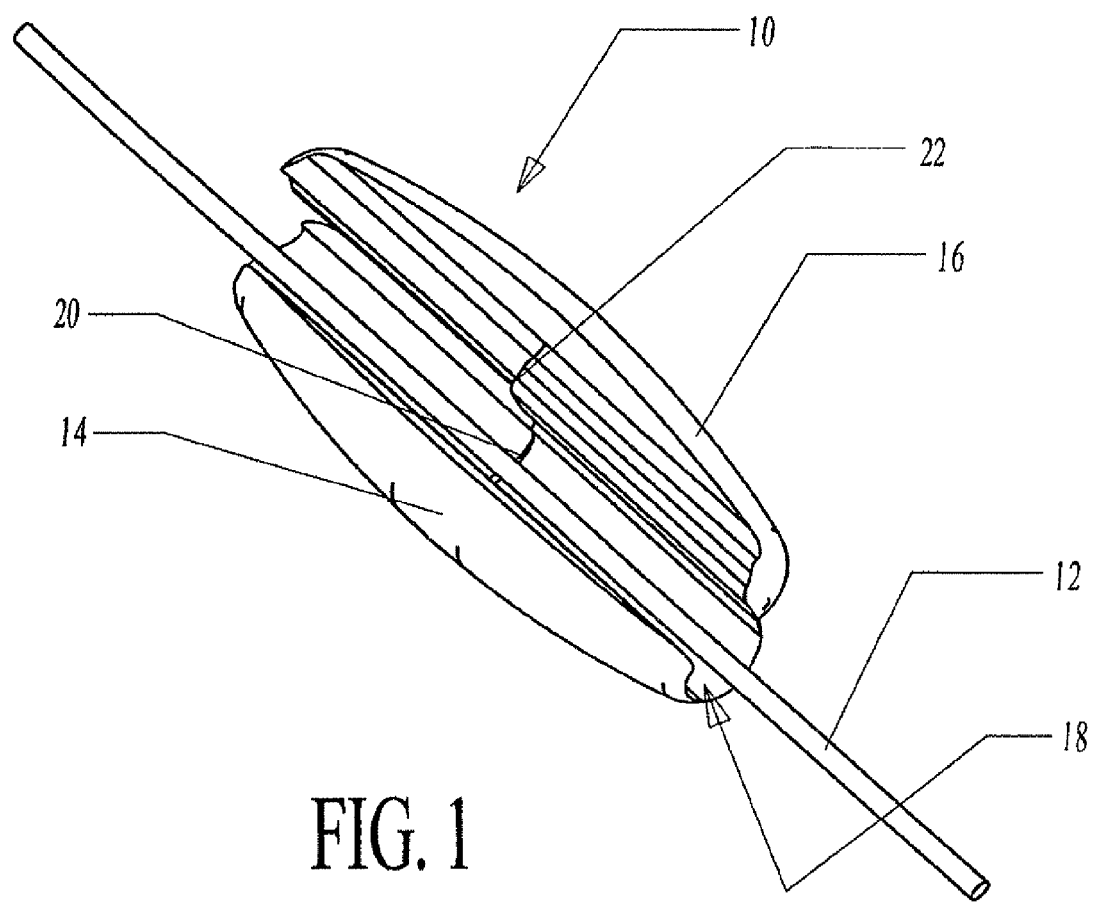
FIG. 1 is a perspective view of an elongated bead of the present invention attached to a string having a lid shown in the open position.

Those skilled in the art will appreciate that the embodiments of the present invention described herein are exemplary and modifications may be made without departing from the intended scope of the invention. For example, without any limitation intended, although the bead of the present invention is shown in the drawings as being elliptical or spherical, those skilled in the art will appreciate that the bead of the present invention includes alternative shapes and sizes without departing from the intended scope of the invention.

Figure 2:
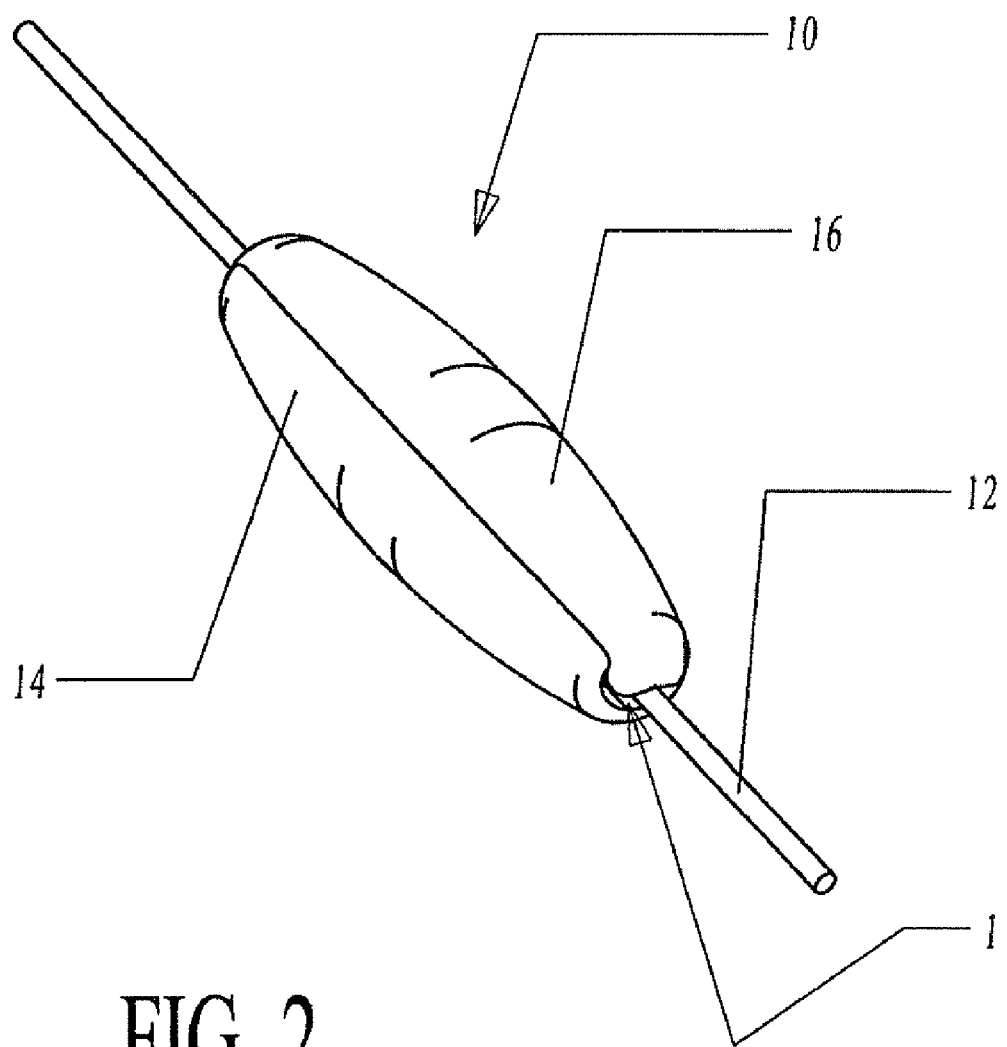
FIG. 2 is a perspective view of the bead of the type as shown in FIG. 1 with the lid in the closed position.

Referring first to FIGS. 1 and 2, a bead 10 of the present invention is shown having a string 12 positioned within the bead 10. The bead 10 includes a main body 14 and lid 16. A channel 18 is formed in the main body 14 of the bead 10 and is suitable for receiving the string 12 within the channel 18. The channel 18 includes an offset 20 and the interior of the lid 16 likewise includes an offset 22 that is shaped to conform to the offset 20 of the channel 18. The string 12 is cradled in the channel 18 such that when the lid 16 is closed on the main body 14, the longitudinal surface of the channel and the longitudinal surface of the interior of the lid 16 press against the string 12 in opposite directions, thereby fixing the string in place with respect to the bead 10. When the lid 16 is closed on the main member 14, the channel 18 is generally aligned with a central axis of the bead 10, such that the bead 10 is equally balanced on the string 12 so that the bead 10 does not hang disproportionately on the string 12. Further, when the lid 16 is closed, the external surface of the bead 10 is generally smooth and without abrupt contours that easily catch or snag on adjacent objects.

Figure 3:
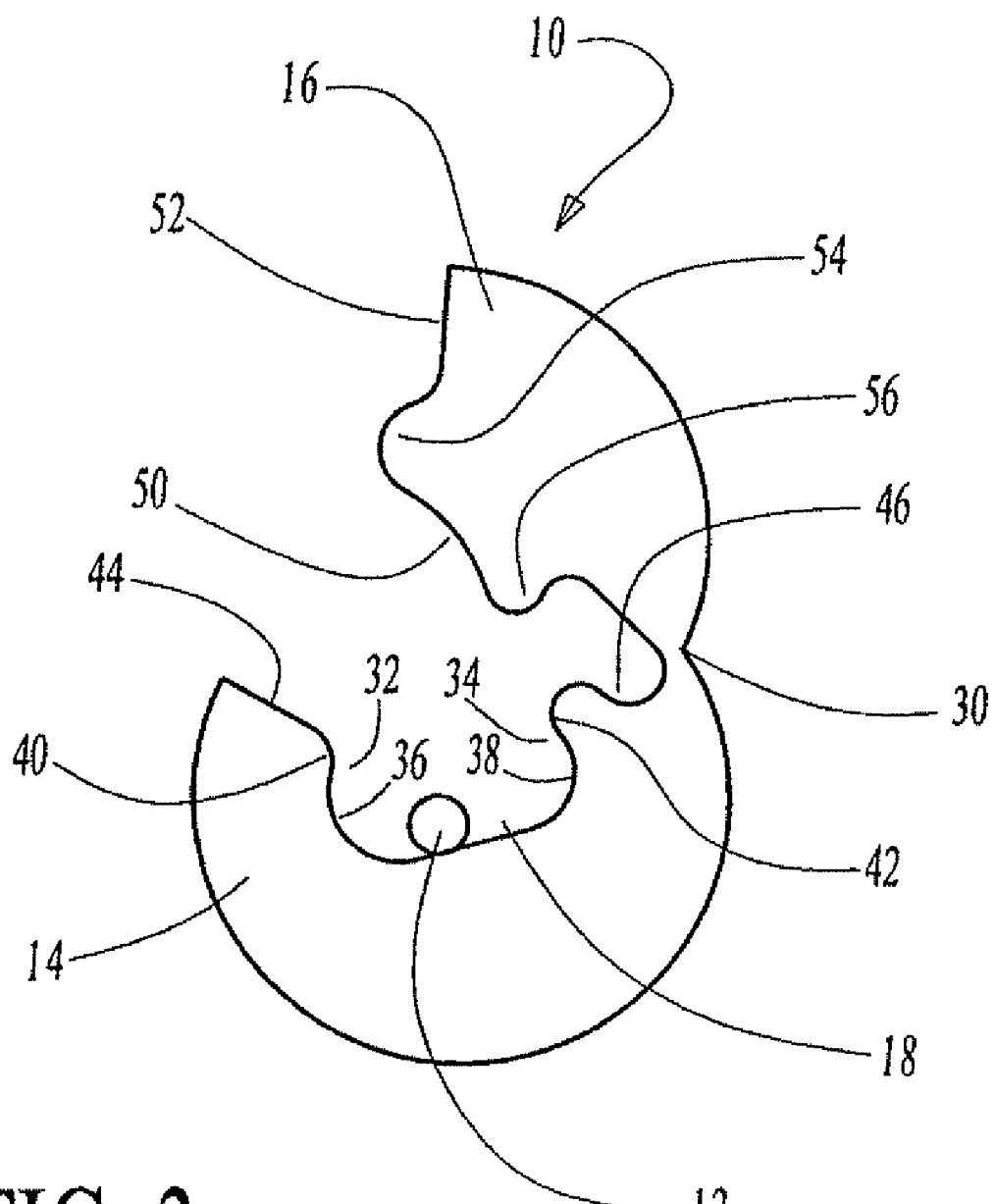
FIG. 3 is an end view of the bead of the type as shown in FIG. 1.
Figure 4:
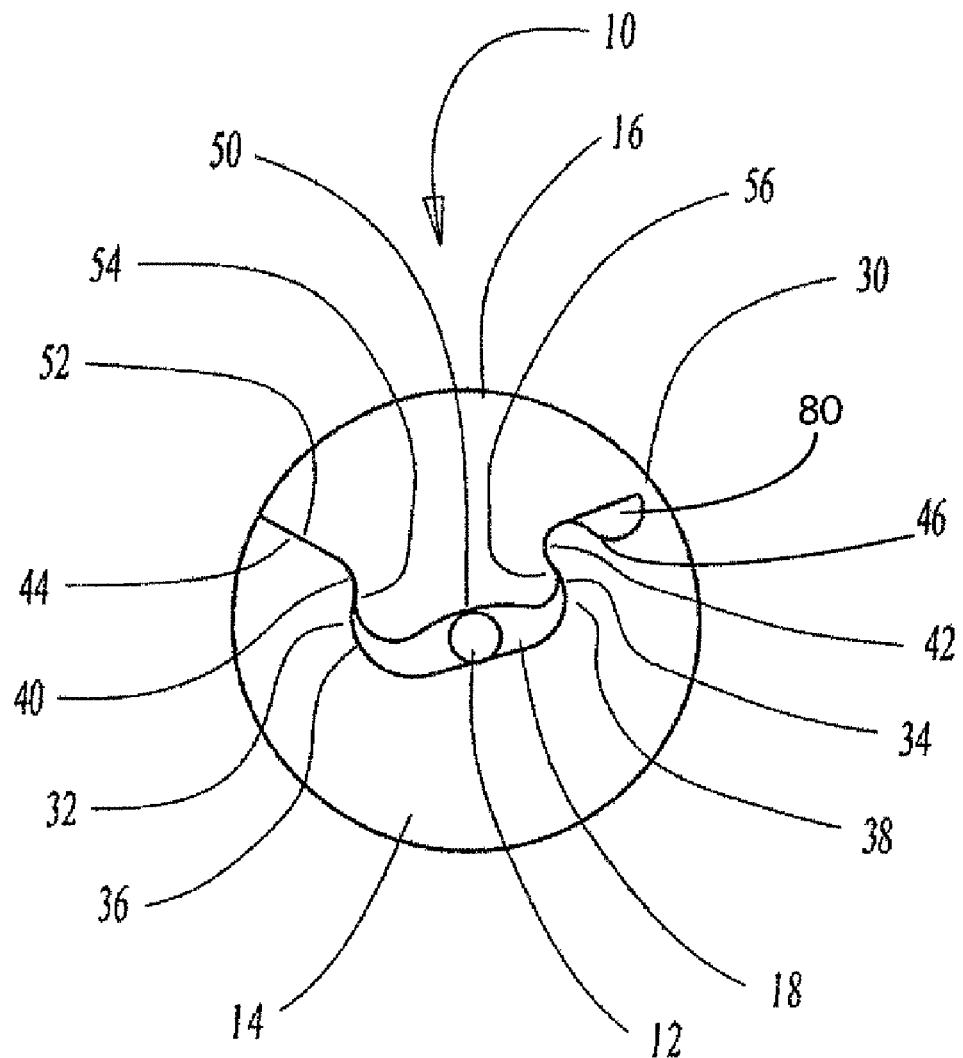
FIG. 4 is an end view of the bead of the type as shown in FIG. 2.

Referring next to FIGS. 3 and 4, the engagement and disengagement of the lid 16 to the main body 14 is shown in greater detail. The main body 14 and lid 16 are interconnected by a web or hinge 30. The hinge 30 aligns the lid 16 parallel to the main body 14 when it is snapped in place. The main body 14, lid 16 and hinge 30 are preferably made, without limitation, from a thermoplastic resin material. The channel 18 within a solid main body 14 is defined by first and second opposing walls 32 and 34. Concave grooves 36 and 38 are formed within each opposing wall that extends the length of the channel 18. First and second upper portions 40 and 42 of the opposing walls 32 and 34 are rounded to reduce friction as the lid 16 engages within the channel 18. The first upper portion 40 extends outwardly along an angle 44 to the outer surface of the bead 10. The second upper portion 42 extends outwardly along a continuous curvature 46 to the hinge 30.

The interior surface of the lid 16 is formed to include a wedge or protrusion 50 having sidewalls 54 and 56 and a shape congruent or mating with the channel 18 and grooves 36 and 38 when the lid 16 is closed on the main body 14. An outer width between the sidewalls 54 and 56 of protrusion 50 is greater than a distance between the first and second opposing walls 32 and 34. When the lid 16 is snapped together into the main body 14, the sidewalls 32 and 34 of the main body 14 slide over the side walls 54 and 56 of the lid 16. Further, when the lid 16 is snapped into the main body 14, an outer edge 52 of the lid 16 rests against or close to the angled surface 44 of first upper portion 40. When the outer edge 52 rests close to the angled surface 44 the outer surface of the bead 10 is smooth.

In use, when the lid 16 is closed on the main body 14, the material near an outer surface of the hinge 30 will stretch while the material near an inner surface of hinge 30 compresses. A gap 80 near the hinge 30, and between the lid 16 and main body 14, allows for the compression of the hinge 30 when the lid 16 is closed onto the main body 14. The outer portion of hinge 30 does not extend past the outer surface of bead 10, creating a flush outer shape when the lid 16 is closed.

Figure 5:
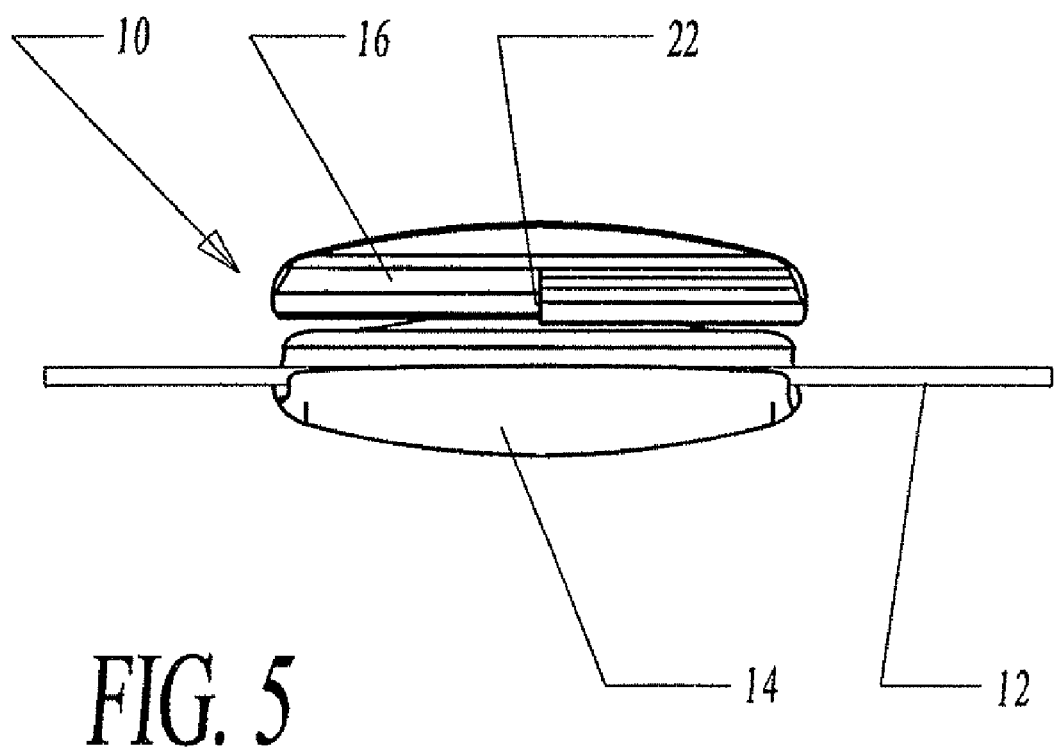
FIG. 5 is a side view of the bead of the type shown in FIG. 1.
Figure 6:
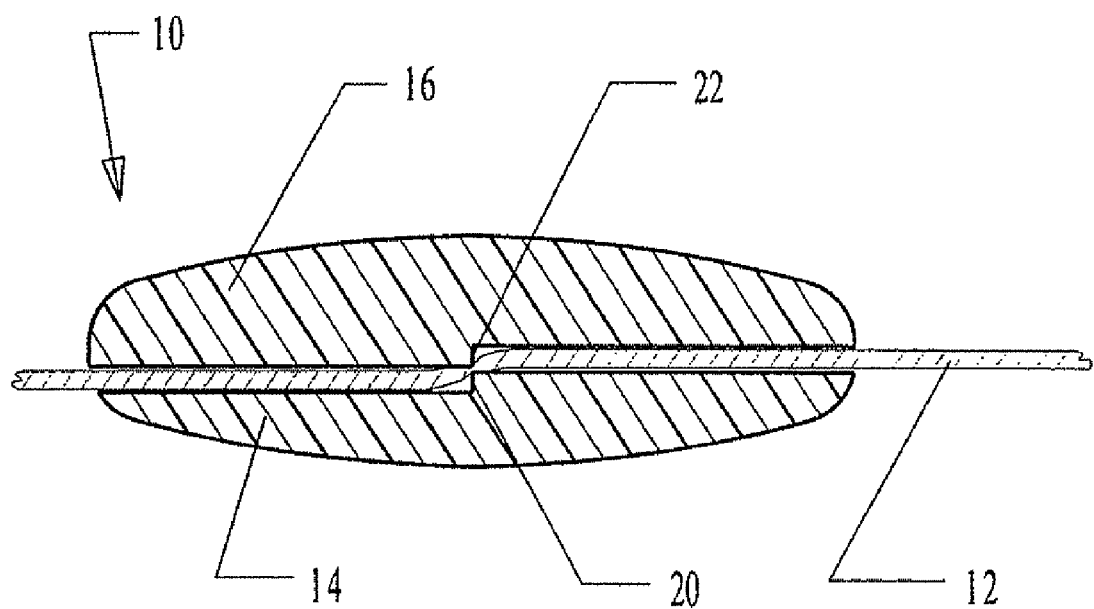
FIG. 6 is a sectional view of the bead of the type shown in FIG. 2.

Referring to FIGS. 5 and 6 the offset 20 in the channel 18 of the main body 14 and offset 22 in the lid 16 are shown. When the lid 16 is closed, this offset will pinch or crimp the string 12 preventing the string 12 from sliding within the bead 10. The offset may alternatively allow enough of a gap between lid 16 and main body 14 so that string 12 slides within the channel 18. The gap size may be varied so that when the lid 16 is closed varying tensions against the string 12 are achieved.

Figure 7:
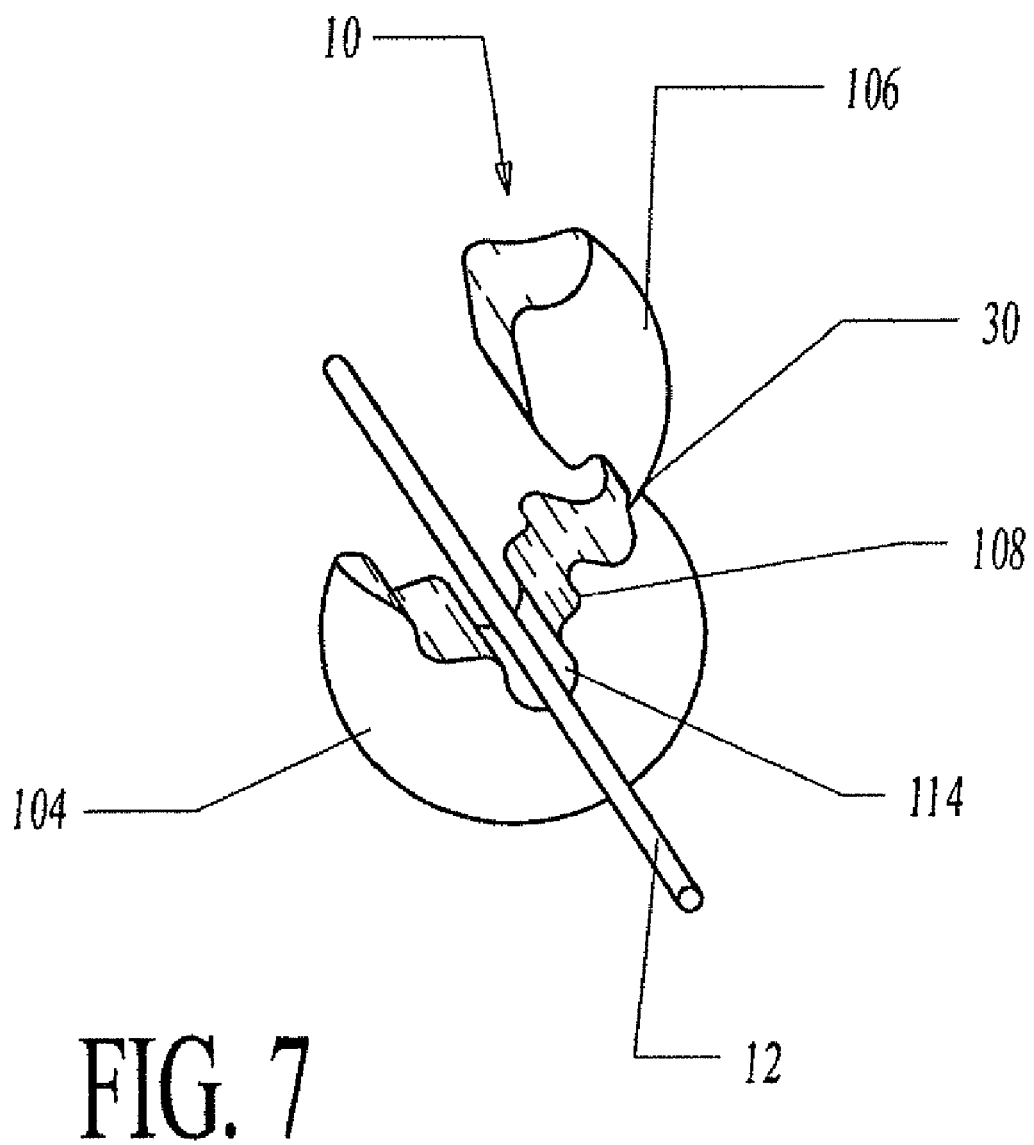
FIG. 7 is a perspective view of an alternate embodiment of the bead of the present invention having a cover shown in an open position.
Figure 8:
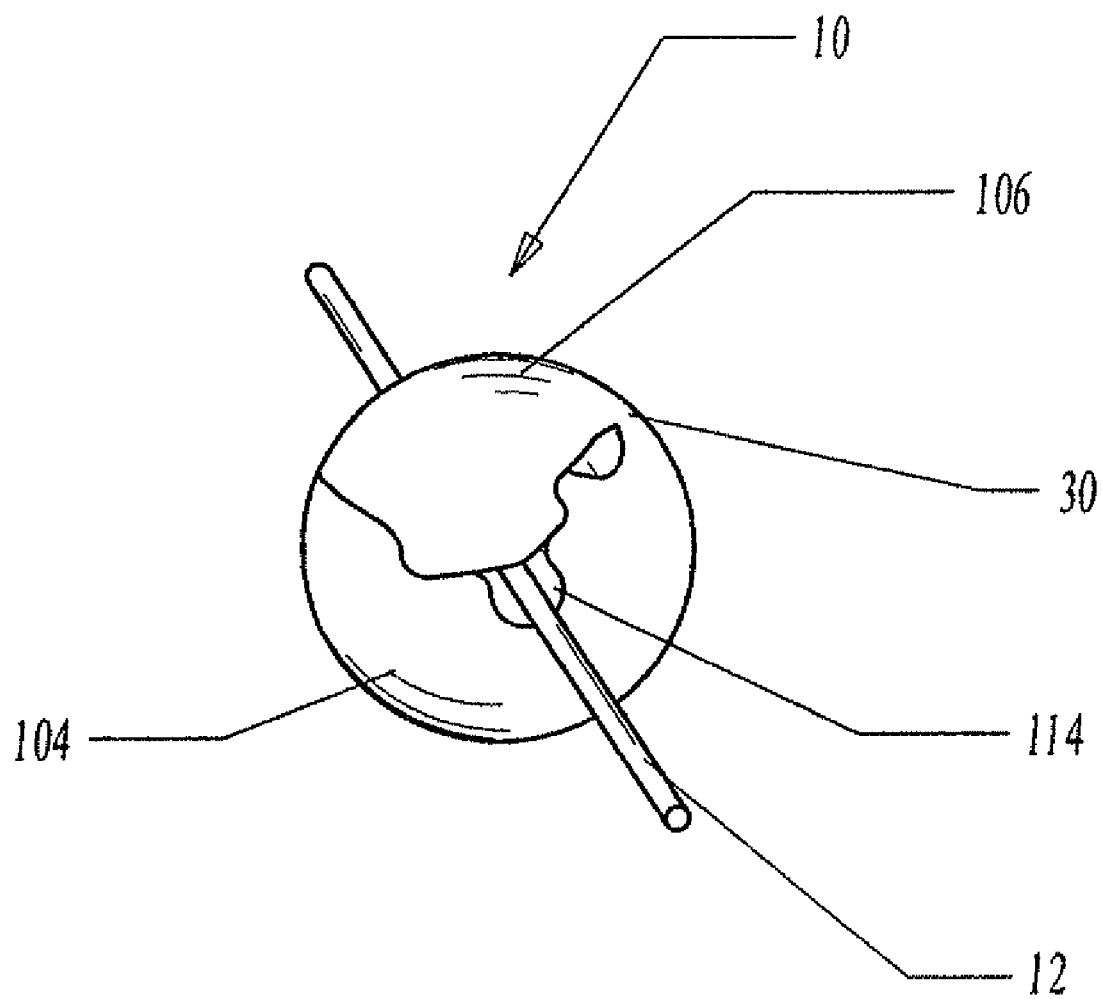
FIG. 8 is a perspective view of the bead of the type shown in FIG. 7 having the cover in a closed position.

Referring first to FIGS. 7 and 8, an alternative bead 10 of the present invention is shown having a string 12 positioned within the bead 10. The bead 10 includes a main body 104 and lid 106. A channel 108 is formed in the main body 104 of the bead 10. A recession 114 is formed in a lower portion of the channel 108 and is suitable for receiving the string 12 within the recession 114. The string 12 is cradled in the recession 114 such that when the lid 106 is closed on the main body 104, the longitudinal surface of the channel 108 and the longitudinal surface of the interior of the lid 16 press together to trap the string 12 in the recession 114 within the bead 10. Alternatively, the size of the recession 114 or string 12 may vary so that a surface of the lid 106 engages with a surface of the string 12. When the lid 106 is closed on the main body 104, the channel 108 is generally aligned with a central axis 108 of the bead 10, such that the bead 10 is equally balanced on the string 12 so that the bead 10 does not hang disproportionately on the string 12. Further, when the lid 106 is closed, the external surface of the bead 10 is generally smooth and without abrupt contours that easily catch or snag on adjacent objects. Although a spherical shape is shown, alternative shapes may equally apply.

Figure 9:
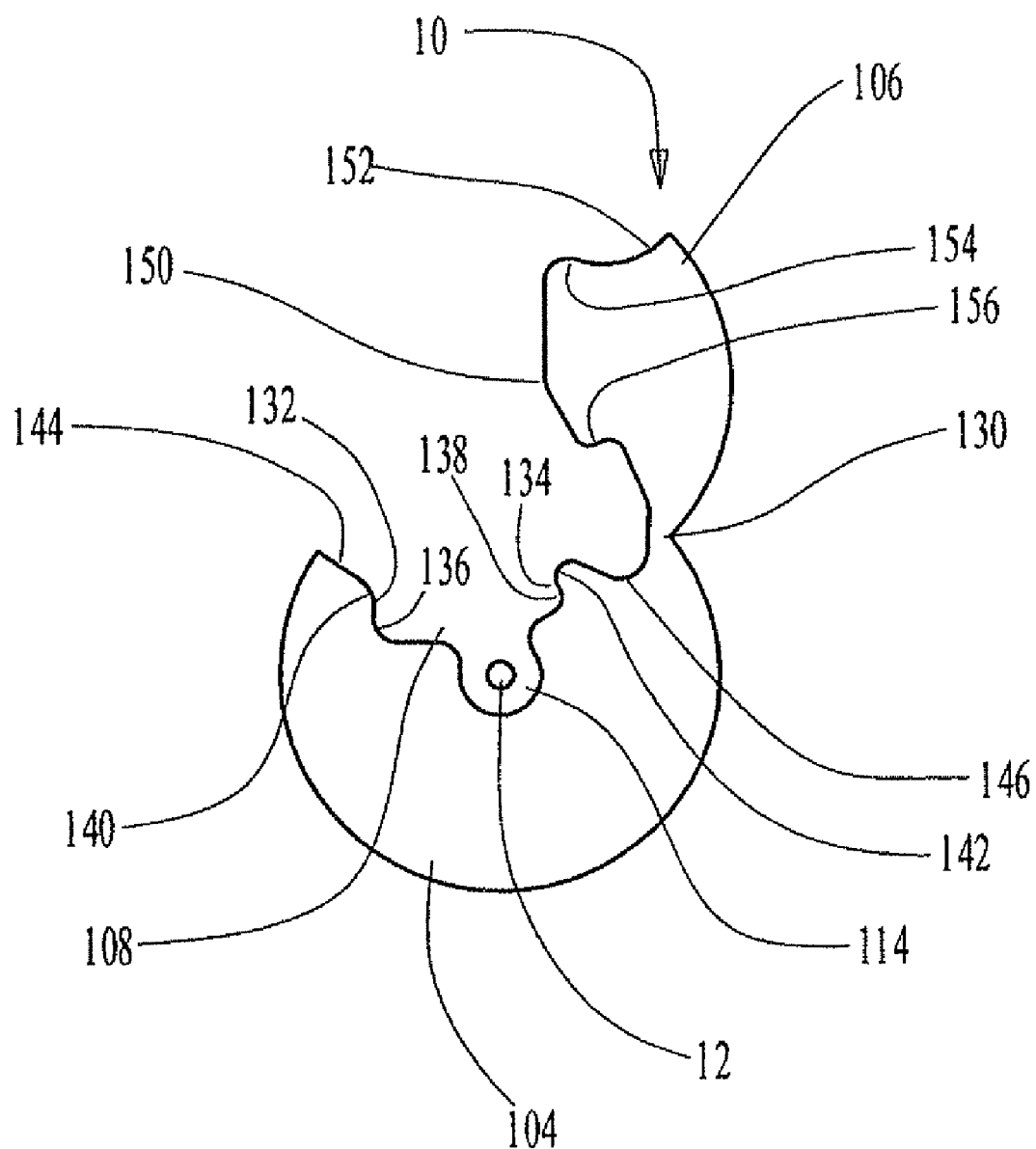
FIG. 9 is an end view of the bead of the type shown in FIG. 7 having the cover in the open position.
Figure 10:
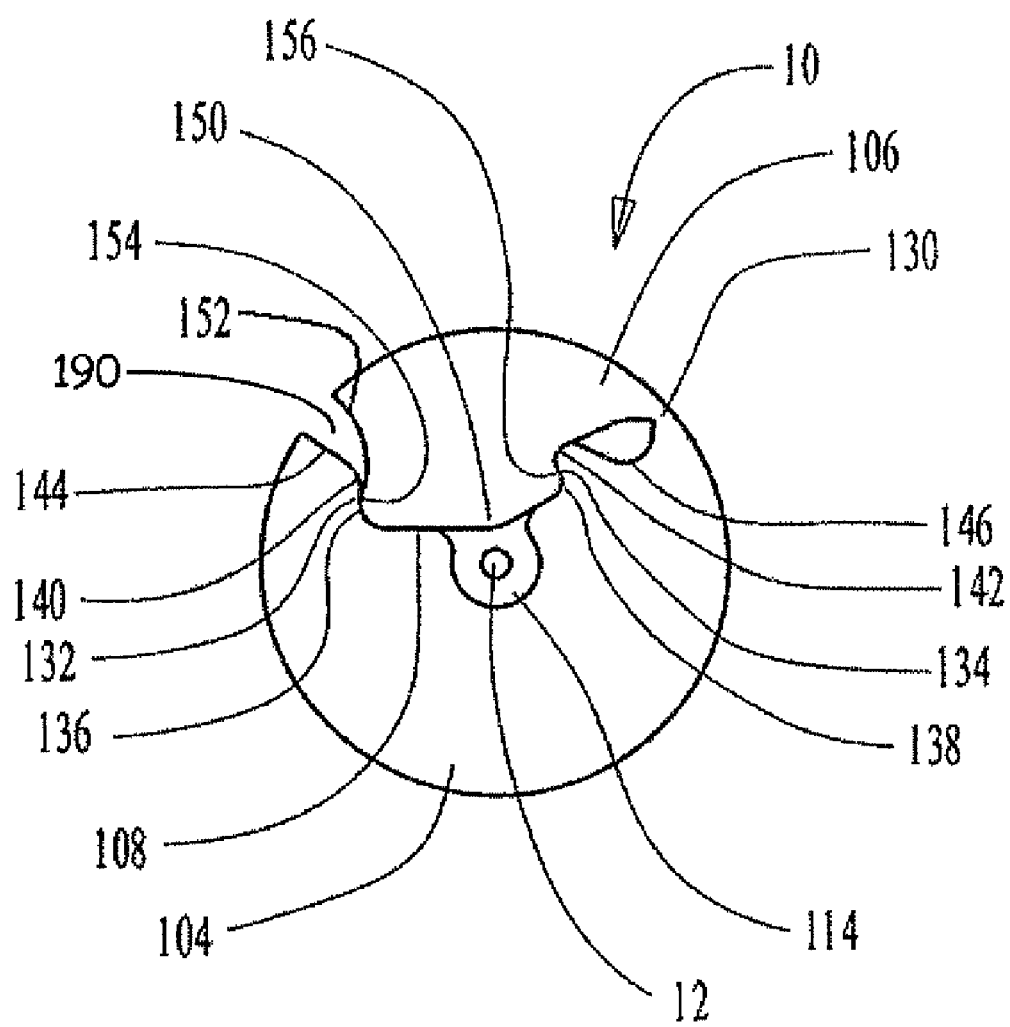
FIG. 10 is an end view of the bead of the type shown in FIG. 7 having the cover in the closed position.

Referring next to FIGS. 9 and 10, the engagement and disengagement of the lid 106 to the main body 104 is shown in greater detail. The main body 104 and lid 106 are interconnected by a web or hinge 130. The hinge 130 aligns the lid 106 parallel to the main body 104 when it is snapped in place. The main body 104, lid 106 and hinge 130 are preferably made, without limitation, from a thermoplastic resin material. The channel 108 within the main body 104 is defined by first and second opposing walls 132 and 134. Concave grooves 136 and 138 are formed within each opposing wall that extends the length of the channel 108. First and second upper portions 140 and 142 of the opposing walls 132 and 134 are rounded to reduce friction as the lid 106 engages within the channel 108. The first upper portion 140 extends outwardly along an angle 144 to the outer surface of the bead 10. The second upper portion 142 extends outwardly along a continuous curvature 146 to the hinge 130.

The interior surface of the lid 106 is formed to include a protrusion 150 having sidewalls 154 and 156 and a shape mating with the channel 108 and grooves 136 and 138 when the lid 106 is closed on the main body 104. An outer width between the sidewalls 154 and 156 of protrusion 150 is greater than a distance between the first and second opposing walls 132 and 134. When the lid 106 is snapped together into the main body 104 the sidewalls 132 and 134 of the main body 104 are forced to slide over the side walls 154 and 156 of the lid 106 snapping them together Further, when the lid 106 is snapped into the main body 104, an outer edge 152 of the lid 106 rests against or close to the angled surface 144 of first upper portion 140. The outer edge 152 rests flush to the angled surface 144 the outer surface of the bead 10 is smooth with no gap between surface 152 and surface 144. An optional enhancement of the design is to leave a gap 190 between surface 152 and 144 allowing for a sharp tool to be wedged into the gap and pry open the bead 10. This will allow the bead 10 to be removed and used again.

Figure 11:
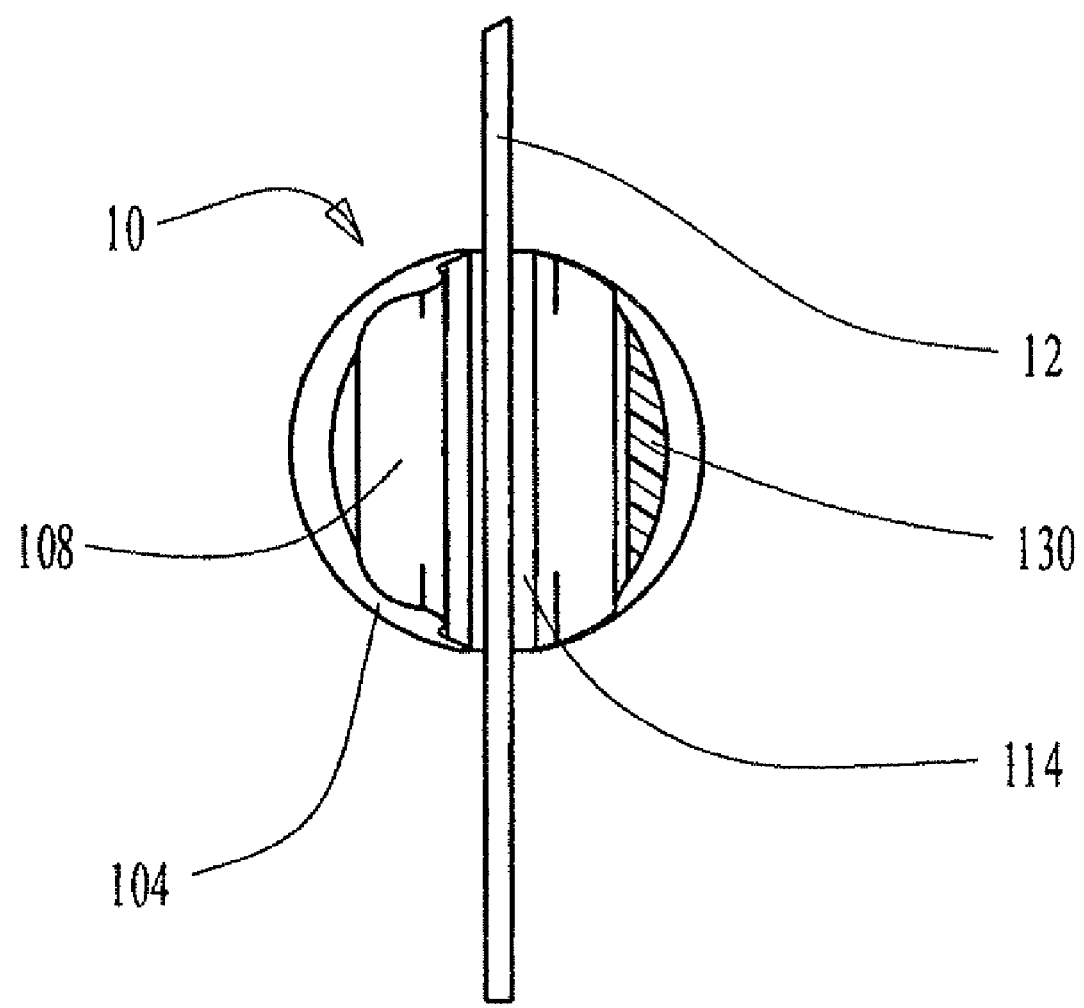
FIG. 11 is a top sectional view of the bead of the type shown in FIG. 9.

Referring to FIG. 11, the hinge 130 is shown with an outside surface of the hinge congruent with an outer surface of the bead 10 and an inner surface of the hinge forming a planar interior parallel with channel 108. When the lid 106 is closed on the main body 104, the material near an outer surface of the hinge 130 will stretch while the material near an inner surface of hinge 130 compresses. A gap near the hinge 130, and between the lid 106 and main body 104, allows for the compression of the hinge 130 when the lid 106 is closed onto the main body 104. The hinge 130 does not extend past the outer surface of bead 10, creating a flush outer shape when the lid 106 is closed.

This invention has been described herein in considerable detail in order to comply with the patent statutes and to provide those skilled in the art with the information needed to apply the novel principles and to construct and use such specialized components as are required. However, it is to be understood that the invention can be carried out by specifically different constructions, and that various modifications, both as to the construction and operating procedures, can be accomplished without departing from the scope of the invention itself.

What is claimed is:

1. A fishing line stop comprising:
 a lid having an inner wall, an outer wall, a first sidewall, and a second sidewall, the lid inner and outer walls extending between the lid first and second sidewalls, the lid outer wall forming a portion of an outer surface of the fishing line stop, the lid inner wall having a first surface and a second surface, the lid inner wall first and second surfaces being separated from each other by a lid offset that runs perpendicular to a central longitudinal axis of the fishing line stop, the lid inner wall first surface being a first distance away from the lid outer wall, the lid inner wall second surface being a second distance away from the lid outer wall, the first and second distances being different from each other, the lid first and second sidewalls connecting to the lid inner wall at rounded concave corners, the rounded concave corners running along the central longitudinal axis of the fishing line stop;

a main body having an inner wall, an outer wall, a first sidewall, and a second sidewall, the main body inner and outer walls extending between the main body first and second sidewalls, the main body outer wall forming another portion of the outer surface of the fishing line stop, the main body inner wall having a first surface and a second surface, the main body inner wall first and second surfaces being separated from each other by a main body offset that runs perpendicular to the central longitudinal axis of the fishing line stop, the main body inner wall first surface being a third distance away from the main body outer wall, the main body inner wall second surface being a fourth distance away from the main body outer wall, the third and fourth distances being different from each other, the main body first and second sidewalls connecting to the main body inner wall at rounded convex corners that run along the central longitudinal axis of the fishing line stop; and wherein the lid inner wall first surface opposes the main body inner wall first surface and the lid inner wall second surface opposes the main body inner wall second surface such that the lid and the main body inner walls form a channel offset within an interior of the fishing line stop when the lid is closed into the main body.

2. The fishing line stop of claim 1, further comprising:
a hinge that connects the lid to the main body, the hinge running parallel to the central longitudinal axis along a length of the fishing line stop.

3. The fishing line stop of claim 2, wherein the hinge has an outer surface that forms yet another portion of the outer surface of the fishing line stop, wherein the lid inner wall and the main body inner wall form a channel that runs along the length of the fishing line stop, and wherein the channel offset forms a pinch point in the channel.

4. The fishing line stop of claim 3, wherein the lid outer surface, the hinge outer surface, and the main body outer surface form a smooth continuous surface that runs along an outer periphery of the fishing line stop, wherein the outer periphery includes two apertures, and wherein the channel extends between the two apertures.

5. The fishing line stop of claim 4, further comprising:
a gap that runs parallel to the central longitudinal axis of the fishing line stop and to the hinge, and wherein an inner surface of the hinge is compressible into the gap.

6. The fishing line stop of claim 5, wherein the gap is within the interior of the fishing line stop when the lid is closed into the main body, and wherein the lid inner wall has a concave shape that runs along the length of the fishing line stop.

7. A fishing line stop comprising:
a main body having a channel extending both generally parallel to a longitudinal axis of the main body and into the main body from an outer surface of the main body, a first end of the channel that extends into the main body at a first outer portion of the main body and a second end of the channel that extends into the main body at a second outer portion of the main body, the channel having widths perpendicular to a length of the channel, a width of the channel at a bottom portion of the channel being greater than a width of the channel at an upper portion of the channel, the bottom and upper portions of the channel being connected together through smooth rounded convex corners that run along the length of the channel, the channel including a channel offset that extends transverse to the length of the channel and divides the channel into a first portion and a second portion, the first and the second portions each having a depth which is different from the depth of the other, the first and second portions having lengths that run along the length of the channel, the lengths of the first and second portions being approximately equal;

a lid including a wedge extending from a top portion of the lid, wherein a shape of a portion of the wedge and a shape of the main body are congruent such that when the lid is aligned and engaged with the main body, the wedge engages with the main body in a portion of the channel, wherein an outer width of a bottom portion of the wedge is greater than the width of the channel at the upper portion of the channel and is less than the width of the channel at the bottom portion of the channel, the lid including a lid offset that divides the wedge into a wedge first portion and a wedge second portion, the first and the second portions of the wedge each having a height which is different from the height of the other, the first and second portions of the wedge having lengths that run along the length of the channel, the lengths of the first and second portions of the wedge being approximately equal; and wherein the channel offset and the lid offset form a pinch point having sharp angular corners that are separated from each other by a distance that is less than a width of a fishing line when the wedge is engaged in the portion of the channel.

8. The fishing line stop of claim 7, further comprising:
a flexible hinge interconnecting the lid to the main body that enables the lid to be rotated into and out of the main body such that a fishing line can be placed into and taken out of the channel.

9. The fishing line stop of claim 8, wherein the flexible hinge has a pivot axis that is aligned in parallel to the channel, and wherein the bottom portion of the wedge has a convex shape that is configured to center the fishing line within the fishing line stop when the lid is rotated into the main body.

10. The fishing line stop of claim 9, further comprising:
a gap that runs along the length of the channel; and
wherein an overall width of the fishing line stop is configured to be less than an inner diameter of a fishing pole eye such that the fishing line stop can be reeled through the fishing pole eye.

11. The fishing line stop of claim 10, wherein the gap is located between the main body, the lid, and the flexible hinge, and wherein an overall length of the fishing line stop is greater than the overall width of the fishing line stop such that the fishing line stop has an approximately cylindrical shape.

12. The fishing line stop of claim 11, wherein the main body, the lid, and the flexible hinge form a smooth continuous outer surface of the fishing line stop, and wherein the fishing line stop is made from a thermoplastic resin material.

13. The fishing line stop of claim 12, wherein a fishing line is positioned within the fishing line stop, and wherein the lid offset and the channel offset prevent the fishing line stop from sliding along the fishing line when the lid is in a closed position, and wherein the fishing line is able to be removed from the fishing line by rotating the lid into an opened position.

* * * * *